（12) United States Patent
Tomaszewicz

(10) Patent No.: US 10,800,512 B2
(45) Date of Patent: Oct. 13, 2020

(54) SYSTEM AND METHOD FOR PROPELLER PITCH CONTROL

(71) Applicant: General Electric Company, Schenectady, NY (US)

(72) Inventor: Piotr Wincenty Tomaszewicz, Warsaw (PL)

(73) Assignee: General Electric Company, Schenectady, NY (US)

( * ) Notice: Subject to any disclaimer, the term of this patent is extended or adjusted under 35 U.S.C. 154(b) by 909 days.

(21) Appl. No.: 15/251,350

(22) Filed: Aug. 30, 2016

(65) Prior Publication Data

US 2017/0066525 A1   Mar. 9, 2017

(30) Foreign Application Priority Data

Sep. 3, 2015   (PL) ......................................... 413823

(51) Int. Cl.
| | | |
|---|---|---|
| *B64C 11/40* | (2006.01) | |
| *B64C 11/30* | (2006.01) | |
| *F02C 9/58* | (2006.01) | |
| *B64C 11/06* | (2006.01) | |
| *B64C 11/48* | (2006.01) | |
| *B64D 27/10* | (2006.01) | |
| *F01D 7/00* | (2006.01) | |
| *F02C 3/04* | (2006.01) | |

(Continued)

(52) U.S. Cl.
CPC .............. *B64C 11/40* (2013.01); *B64C 11/06* (2013.01); *B64C 11/30* (2013.01); *B64C 11/306* (2013.01); *B64C 11/48* (2013.01); *B64D 27/10* (2013.01); *F01D 7/00* (2013.01); *F02C 3/04* (2013.01); *F02C 6/206* (2013.01); *F02C 9/58* (2013.01); *B64D 27/16* (2013.01); *F05D 2240/35* (2013.01); *F05D 2260/76* (2013.01); *F05D 2260/79* (2013.01); *Y02T 50/66* (2013.01)

(58) Field of Classification Search
CPC . F01D 7/00; F01D 29/36; B64C 11/06; B64C 11/30; B64C 11/40; F04D 15/0055
USPC ...................................... 416/153–156, 168 R
See application file for complete search history.

(56) References Cited

U.S. PATENT DOCUMENTS

| 3,163,231 A | 12/1964 | Barnes et al. |
| 3,501,251 A | 3/1970 | Haglund et al. |

(Continued)

FOREIGN PATENT DOCUMENTS

| CN | 103754363 A | 4/2014 |
| EP | 1881176 A2 | 1/2008 |

(Continued)

OTHER PUBLICATIONS

European Search Report and Opinion issued in connection with corresponding EP Application No. 16186515.9 dated Feb. 15, 2017.

(Continued)

*Primary Examiner* — Ninh H. Nguyen
*Assistant Examiner* — Aye S Htay
(74) *Attorney, Agent, or Firm* — Dority & Manning, P.A.

(57) ABSTRACT

Systems and methods are disclosed for controlling the pitch angle of a propeller and rotor assembly that minimizes circumferential loads and stresses to a pitch angle control system. The system may generally include an annular actuator, load transfer bearing (LTB), and a guide shaft is pivotally attached to the LTB to direct the LTB along an arcuate path relative to a rotor frame.

20 Claims, 6 Drawing Sheets

(51) Int. Cl.
*F02C 6/20* (2006.01)
*B64D 27/16* (2006.01)

(56) References Cited

U.S. PATENT DOCUMENTS

| | | | |
|---|---|---|---|
| 3,873,236 A * | 3/1975 | Gall | F01D 7/00 |
| | | | 416/156 |
| 6,811,376 B2 | 11/2004 | Arel et al. | |
| 7,758,310 B2 | 7/2010 | Cotton et al. | |
| 8,336,290 B2 | 12/2012 | Glynn et al. | |
| 8,721,283 B2 | 5/2014 | Swift et al. | |
| 2010/0310369 A1* | 12/2010 | Perkinson | B64C 11/306 |
| | | | 416/1 |
| 2011/0243735 A1 | 10/2011 | Balk et al. | |
| 2012/0070292 A1* | 3/2012 | Balk | B64C 11/306 |
| | | | 416/168 A |
| 2012/0099987 A1* | 4/2012 | Belmonte | B64C 11/32 |
| | | | 416/34 |
| 2012/0294717 A1 | 11/2012 | Edwards | |
| 2014/0017086 A1* | 1/2014 | Charier | B64C 11/308 |
| | | | 416/128 |
| 2014/0034779 A1 | 2/2014 | Fenny | |
| 2014/0294585 A1* | 10/2014 | Escure | B64C 11/385 |
| | | | 416/147 |
| 2015/0142219 A1 | 5/2015 | Sonneborn | |
| 2015/0147178 A1 | 5/2015 | Frantz et al. | |

FOREIGN PATENT DOCUMENTS

| | | |
|---|---|---|
| EP | 2388191 A2 | 11/2011 |
| FR | 2946010 A1 | 12/2010 |
| FR | 2992703 A1 | 1/2014 |
| GB | 559756 A | 3/1944 |
| GB | 2492882 A | 1/2013 |
| GB | 2493980 A | 2/2013 |
| WO | 9717255 A1 | 5/1997 |
| WO | 2010136685 A2 | 12/2010 |

OTHER PUBLICATIONS

Unofficial English translation of Poland Office Action issued in connection with corresponding PL Application No. P-413823 dated Nov. 21, 2016.

* cited by examiner

SYSTEM AND METHOD FOR PROPELLER PITCH CONTROL

FIELD OF THE INVENTION

The present subject matter relates generally to variable pitch control systems and methods for gas turbine engine propellers, and more particularly to systems and methods for minimizing stress loads of pitch control.

BACKGROUND OF THE INVENTION

Gas turbine engines generally include a core engine powering a turbine to rotate one or more fan or propeller blade. One type of gas turbine engine, known as an "open rotor" design, operates similarly to a conventional turbofan and turboprop designs, but with fuel efficiency that is superior to both. A turbofan engine operates on the principle that a central gas turbine core drives a bypass fan, the fan being located at a radial location between a nacelle of the engine and the engine core. However, in an open rotor design, a "bypass" propeller is mounted outside of an engine's nacelle. This permits the propeller to act on larger volumes of air and generate more thrust than with conventional turbofan engine. In some open rotor engines, the "bypass" propeller includes two counter-rotating rotor assemblies, each rotor assembly carrying an array of propeller blades located outside the engine nacelle.

A pitch control system may be attached to the propellers in order to alter the propellers' pitch angle according to desired flight characteristics. Optimum performance requires such systems to have a high-degree of accuracy. In addition, optimum performance may require the pitch angle of multiple propeller blades to be altered in unison. However, repeated or irregular pitch alterations may subject the pitch control system to excessive stresses or harmful loads. Over time, these stresses may decrease system accuracy or lead to engine failure. Current systems fail to adequately minimize friction and stress. Moreover, their attempted synchronization of pitch alterations can be unreliable.

Accordingly, improved pitch control systems and methods are desired. In particular, pitch control systems and methods for gas turbine engines that minimize operational stresses, increase accuracy, and allow for uniform pitch alterations would be advantageous.

BRIEF DESCRIPTION OF THE INVENTION

Aspects and advantages of the invention will be set forth in part in the following description, or may be obvious from the description, or may be learned through practice of the invention.

A propeller pitch control system and method is generally provided that minimizes circumferential loads applied to the system.

In accordance with one embodiment, the pitch control system includes an annular actuator mounted to a static engine frame about a central axis. The annular actuator is able to translate along a path parallel to the central axis. A load transfer bearing (LTB) is translationally fixed to the actuator, while a crank rod first end is pivotally attached to the LTB. A crank rod second end is pivotally attached to a propeller blade crankshaft. A radial pin extends outward from the LTB, and a guide shaft is pivotally attached to the radial pin to direct the radial pin along an arcuate path relative to a rotor frame upon translation of the annular actuator.

In accordance with another embodiment, a gas turbine engine is included. The gas turbine engine includes a static frame extending along a central axis and a rotor frame rotatably mounted to a static frame about the central axis. Also included is a plurality of circumferential propeller blade assemblies, at least one blade assembly including a variable pitch propeller blade and a crankshaft to direct pivotal movement of the blade about a discrete radial axis. An annular actuator is mounted to the static frame and is translatable along a path parallel to the central axis. A load transfer bearing (LTB) is translationally fixed to the actuator, while a crank rod first end is pivotally attached to the LTB. A crank rod second end is pivotally attached to a propeller blade crankshaft. A radial pin extends outward from the LTB, and a guide shaft is pivotally attached to the radial pin to direct the radial pin along an arcuate path relative to a rotor frame upon translation of the annular actuator.

In accordance with another embodiment, a method of changing propeller pitch is included. The method includes the steps of supplying a linear input force at an annular actuator in a direction parallel to a central axis, thereby initiating a linear input movement at a load transfer bearing (LTB). The LTB is included in a pitch control system that includes the annular actuator mounted to the static frame, a radial pin extending from the LTB, and a guide shaft pivotally attached to the radial pin. The LTB is disposed about the annular actuator. A converting step converts the linear input movement to a roto-translation movement, including directing the LTB along an arcuate path relative to the rotor frame. Another step includes transferring the roto-translation movement to the crankshaft along a crank rod positioned between the LTB and the crankshaft, including transmitting a longitudinal displacement component to the crankshaft, and pivoting the at least one propeller blade about the radial axis according to the longitudinal displacement transmitted to the crankshaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
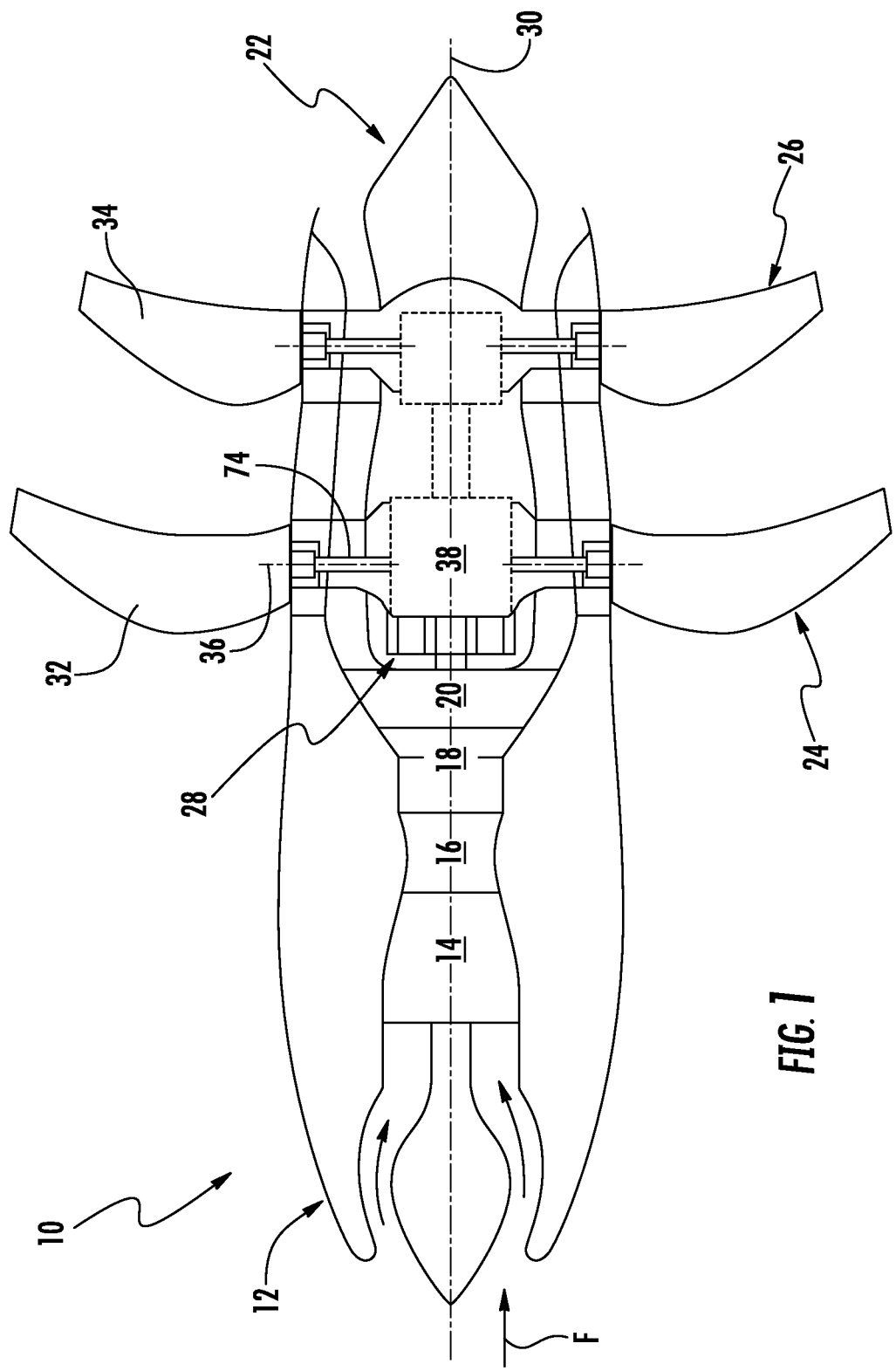
FIG. 1 is a schematic axial sectional view of an open rotor counter rotational engine incorporating a pitch control system for one of the propellers.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. The specific embodiments discussed herein are merely illustrative of specific ways to make and use the invention and do not delimit the scope of the invention.

In order to aid understanding of this disclosure, several terms are defined below. The defined terms are understood to have meanings commonly recognized by persons of ordinary skill in the arts relevant to the present invention.

The terms "includes" and "including" are intended to be inclusive in a manner similar to the term "comprising." Similarly, the term "or" is generally intended to be inclusive (i.e., "A or B" is intended to mean "A or B or both"). The phrase "in one embodiment," does not necessarily refer to the same embodiment, although it may.

The terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The terms "radial" or "radially" refer to a dimension extending between a center longitudinal axis of the engine and an outer engine circumference. The term "forward" used in conjunction with "axial" or "axially" refers to a direction toward the engine inlet, or a component being relatively closer to the engine inlet as compared to another component. The terms "rear" or "aft" used in conjunction with "axial" or "axially" refers to a direction toward the engine nozzle, or a component being relatively closer to the engine nozzle as compared to another component. Unless stated otherwise, the positional terms "above"/"below," "upward"/"downward," "outer"/"inner," and "outward"/"inward" refer to radial positioning and direction relative to the central axis.

Referring now to the figures, FIG. 1 illustrates an exemplary open rotor gas turbine engine 10 defining a central axis 30. The open rotor gas turbine engine 10 may be configured as a tractor (rotors ahead of the engine in a pulling configuration), or as a pusher (shown). Although depicted as a particular architecture in the disclosed non-limiting embodiment, it should be understood that the concepts described herein are applicable to other architectures.

Generally, and as shown, the gas turbine engine 10 incorporates one or more compressors 14, a combustor 16, and one or more turbines 18, 20. A low-pressure power turbine 20 is operably joined to an epicyclical gearbox 28 which, in turn, is operably joined to counter-rotating unducted rotor assemblies 24, 26.

During operation, the flow of a compressible fluid (e.g., gas) stream F begins inside nozzle of the nacelle 12. From there, the gas stream travels through the one or more compressors 14 before being ignited with a fuel at the annular combustor 16. The combustion rotates the high-pressure turbine 18 and the low-pressure turbine 20 before being expelled at the exhaust 22. Rotation of the low-pressure turbine 20 rotates the gearbox 28 which then rotates the counter-rotating rotor assemblies 24, 26.

The propeller blades 32, 34 of the forward and aft propellers are of the variable setting angle type (i.e. they can be oriented about their respective radial pivot axes 36 by virtue of a system 38 for changing or orienting the pitch of the blades) so that the blades assume an optimal angular position according to the operating conditions of the engine and the relevant flight phases. In the present description, only the pitch control system 38 for orienting blades associated with the forward rotor assembly 24 will be described. The aft rotor assembly 26, which is not shown in FIGS. 2-6, can be provided with a system for orienting blades that is similar or different to that described hereafter with reference to the forward rotor assembly 24.

Figure 2:
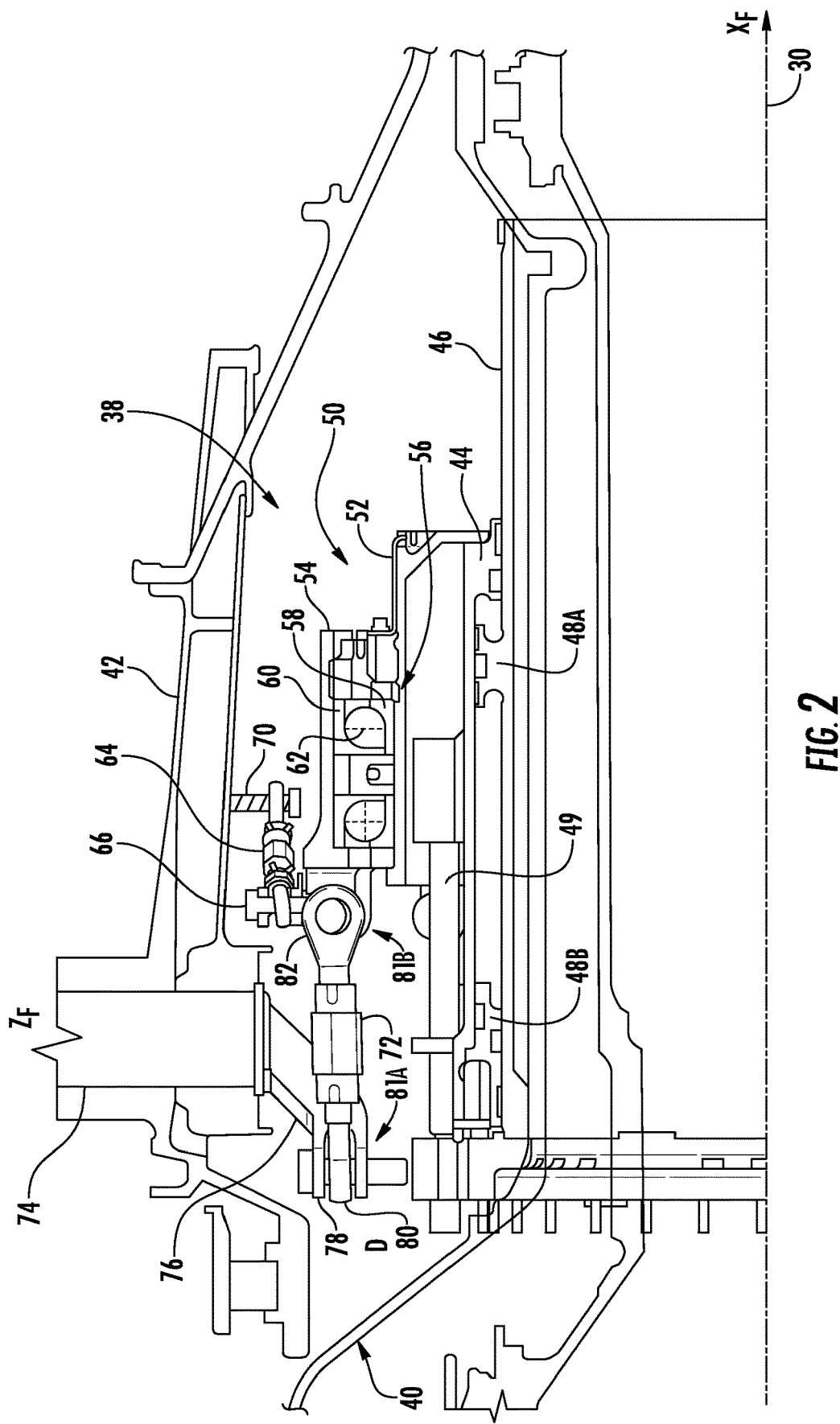
FIG. 2 is a cross-sectional view of a gas turbine engine in accordance with one embodiment of a pitch control system.

To this end, as shown in FIGS. 1 and 2, the system 38 for controlling the pitch of the propeller blades (and thus their setting angle) is provided inside the engine 10, in the internal space positioned between the static frame 40 and the rotatable rotor frame 42, so as to vary the angular position of the blades and, thus, the pitch of the propeller.

As seen in FIG. 2, the pitch control system 38 comprises an annular actuator 44 that moves linearly (i.e., translates) along the central axis 30 of the engine. The actuator 44 surrounds a cylinder housing 46 and is able to translate back and forth therealong to vary the actuator's translation length. Since, the actuator 44 is mounted to the static frame 40, the translation length may be defined parallel to the central axis 30. Generally, as the translation length increases, the actuator's axial position is moved rearward. As the translation length decreases, the actuator's axial position is moved forward toward the engine nozzle. As will be described below, the actuator's translation length is operably tied to the pitch of the propeller. Therefore, translation length of the actuator 44 may be selected according the desired pitch angle 84A, 84B of the propeller.

In certain embodiments, stops 48 are provided in the form of a shoulder 48A and a ring 48B to prevent actuator over travel (i.e., limit translation length). A piston 49 is positioned around the cylinder housing 46 and extends linearly along the axis 30, under the direction of an actuator control (not shown). The piston 49 provides a motive input force when translation of the actuator 44 is desired. In some embodiments, the piston 49 is driven by a hydraulic fluid, although additional or alternative embodiments may include a magnetic actuator motor (not shown) to propel the piston 49 parallel to the central axis 30.

A load transfer bearing (LTB) 50 is mounted on the actuator 44 and generally follows the same axial movements. Linear translation of the actuator 44 compels the LTB forward or aft along the central axis 30 according to actuator's translation length. As a result, the LTB 50 is able to move axially with respect to the static frame 40, while remaining translationally fixed to the actuator 44.

In optional embodiments, the LTB 50 has a discrete inner race 52 and outer race 54. As shown in FIG. 2, the inner race 52 of certain embodiments is positioned above the actuator 44 as an annular ring. Similarly, the outer race 54 can be an annular ring positioned above, and concentric with, the inner race 52. The two races 52, 54 shown are translationally fixed. Axial movement of the inner race 52 is, therefore, mirrored by the outer race 54 during pitch change operations. However, rotational movement is not necessarily copied. In certain embodiments, the outer race 54 is able to rotate about the central axis 30 independently (i.e., rotationally free) of the inner race 52. Therefore, while translation of the actuator 44 is transferred to the inner race 52 and outer race 54, rotation of the outer race 54 does not directly affect the annular positioning of the inner race 52 and actuator 44. Instead, translation of the actuator 44 may initiate a new rotational movement for the outer race 54. As a result, a new roto-translational movement may be formed at the outer race 54.

As illustrated, the radial distance between the LTB races 52, 54 is fixed for some embodiments. One or more bearing rings 56 may be positioned between the races 53, 54 in order to support that distance. Optional embodiments of the bearing rings 56 include an inner track 58 and outer track 60 holding a row of ball bearings 62 to reduce friction.

One or more guide shafts 64 joins the LTB 50 to the rotor frame 42. In certain embodiments, a radial pin 66 extends outward from the outer race 54 and couples with the guide shaft 64. A guide shaft 64 may be anchored to the rotor frame 42 such that rotation of the rotor frame 42 causes simultaneous rotation of the guide shaft 64. Optionally, the guide shaft 64 includes a fixed length 68. In certain embodiments, the fixed length 68 is defined by a rigid bar extending between the radial pin 66 and a rotor frame anchor point 70. A pivotal connection may be formed at both the pin 66 and the anchor point 70 (e.g., a yoke and pin joint, as illustrated at FIG. 2).

During operation, the guide shaft 64 constrains the radial pin's positioning relative to the rotor frame 42. Since the rotor frame 42 is translationally static relative to the static frame 40, the guide shaft 64 directs the movement of the radial pin 66 (and thereby, the movement of the outer race 54) during the actuator's translation. Specifically, and as will be described below, translation of the actuator 44 causes the pin 66 to be directed along a set arcuate path 86 relative to the rotor frame 42. In optional embodiments, the arcuate path is defined radially by the guide shaft length 68 and anchor point 70. The guide shaft length 68 and arcuate path 86 are chosen to harmonically match (i.e., form a preselected relationship according to a movement frequency of) the distance between a set point J on the LTB 50 and a portion of the propeller blade 32.

As shown in FIGS. 2-6, some embodiments include one or more crank rods 72 joining the LTB outer race 54 to individual propeller blades 32. Generally, the crank rods 72 each include a rigid body extending longitudinally to connect the LTB 50 to the propeller blades 32.

The propeller blades 32 each include a propeller support column 74 which extends along and rotates about the radial axis 36. A crankshaft 76 may extend outward from the propeller support column 74 (i.e., in a radial direction relative to the radial axis 36) and rotate about the axis 36. Although one end of the crankshaft is potentially fixed to the support column 74, an opposite end may include a journal 78 pivotally attached to the crank rod 72.

Figure 3:
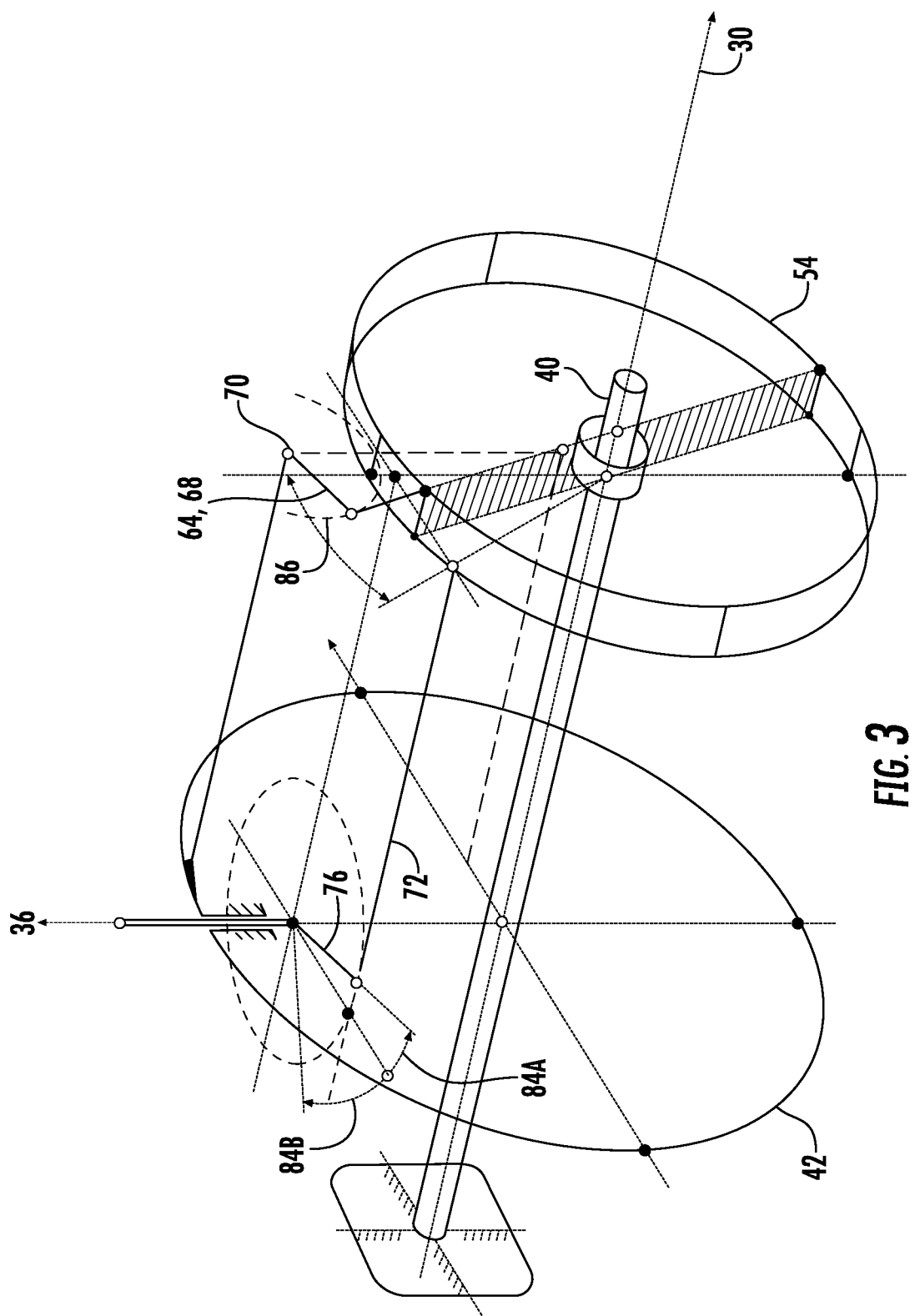
FIG. 3 is a schematic perspective view of engagement and movement paths between several elements of the embodiment of FIG. 2.
Figure 4:
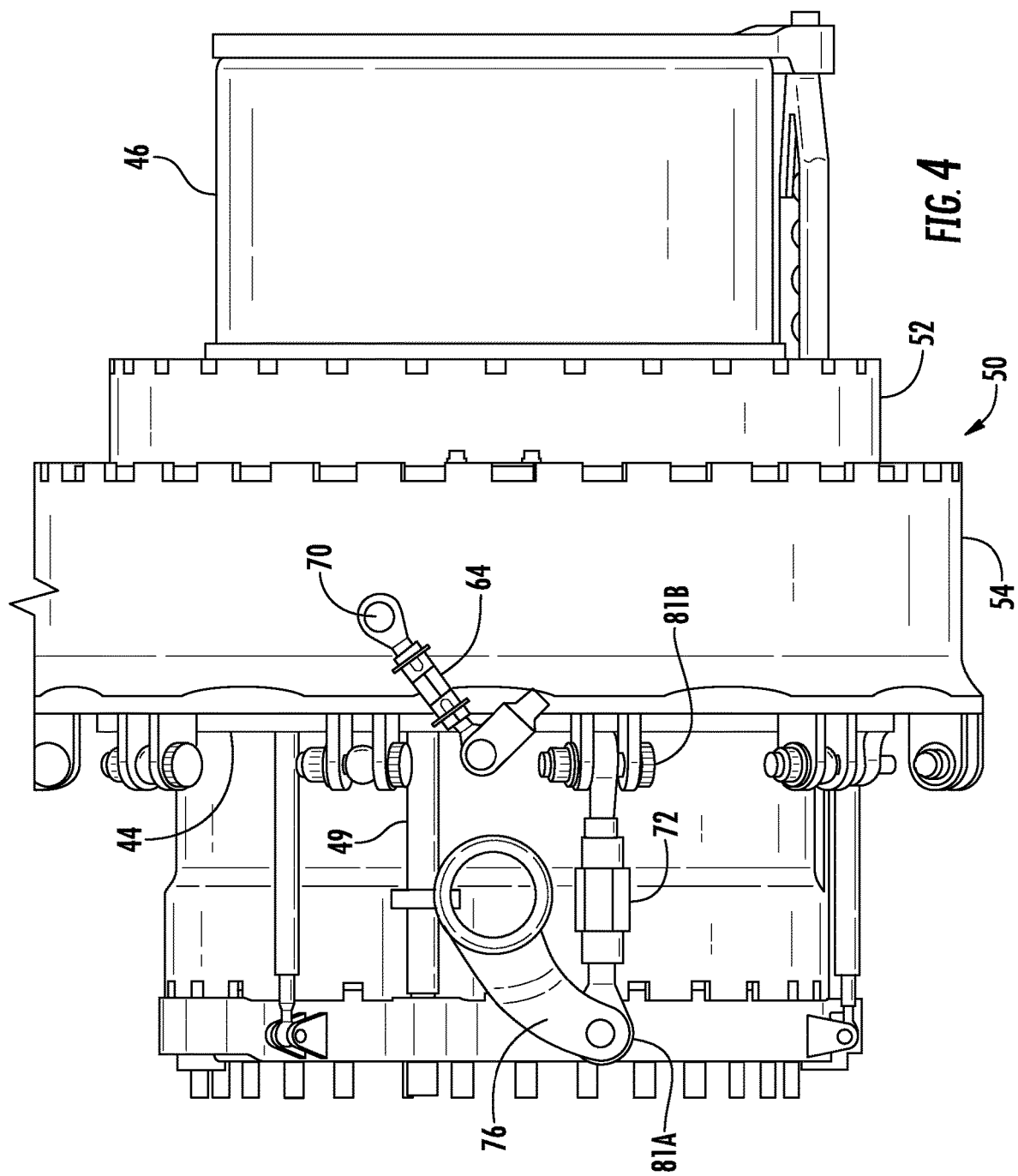
FIG. 4 is an overhead view of one pitch control system embodiment.

In certain embodiments, the crank rod 72 is rotatably yoked to both the crankshaft 76 and LTB outer race 54 at opposite first and second ends 80, 82. As a result, at least two pin and yoke assemblies 81A, 81B are provided in some embodiments, as shown. One pin and yoke assembly 81A joins the crank rod first end 80 with the crankshaft 76. The other pin and yoke assembly 81B joins the crank rod second end 82 with the outer race 54. In between the two ends 80, 82, the crank rod 72 may define a set length. In certain embodiments, the crank rod 72 may further define a predetermined distance between the LTB 50 and the crankshaft journal 78. As shown in FIG. 3, the guide shaft fixed length 68 is harmonically matched to the predetermined distance (e.g., the set length of the crank rod) such that the roto-translational movement of the LTB outer race 54 controls the pivotal rotation of the crankshaft 76 at the journal 78. As a result, the crank rod 72 of such embodiments is maintained in a predetermined pivotal range θ relative to the central axis 30 during both forward and aft translation.

Figure 6:
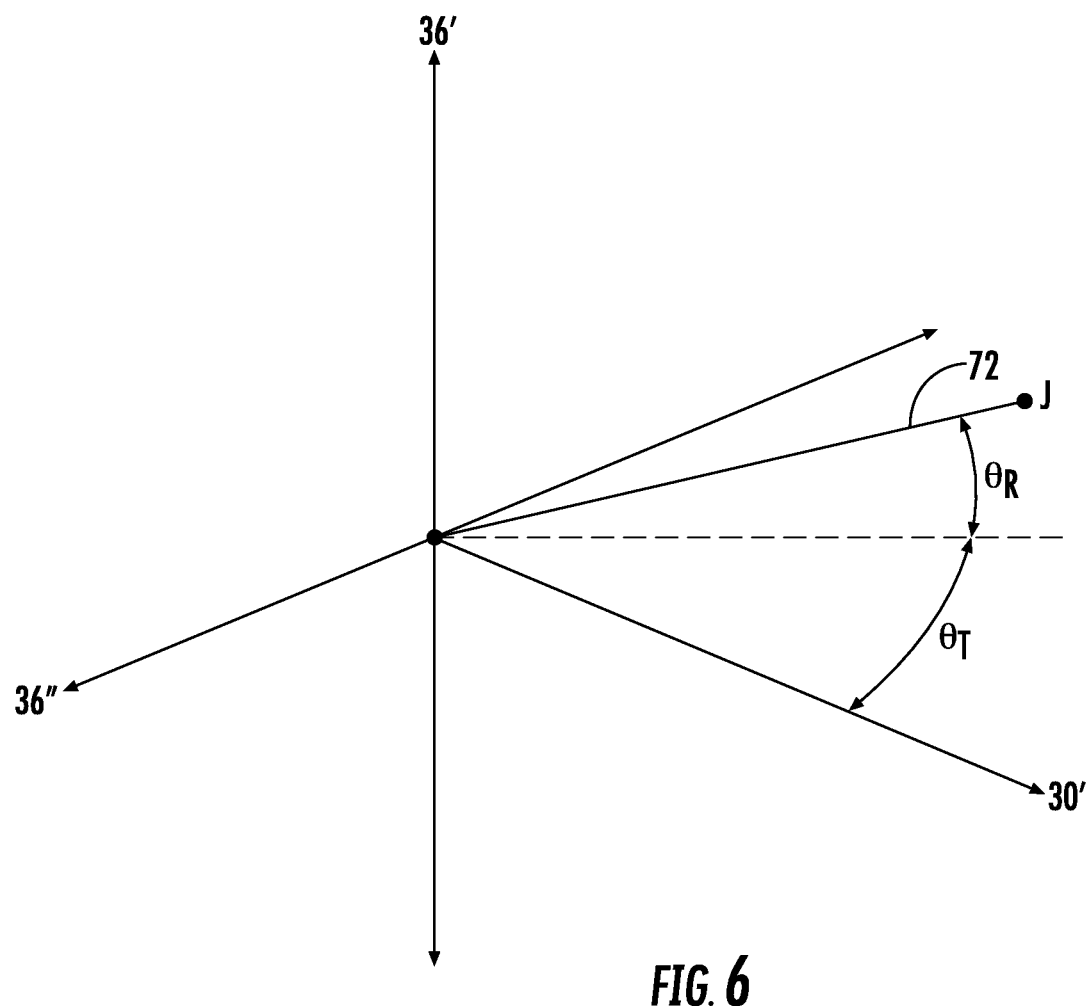
FIG. 6 is a schematic perspective view of a pivotal range of one crank rod embodiment.

In some embodiments, the pivotal range θ includes a radial range $\theta_R$ and a tangential range $\theta_T$ defined relative to the central axis 30. As shown in FIG. 6, the radial range $\theta_R$ represents the radial deflection of the crank rod 72 relative the central axis 30' during operation, while the tangential range represents the tangential deflection of the crank rod 72 relative to the central axis 30' (wherein 30' is understood to be a reference axis parallel to the central axis 30, 36' is understood to be a reference axis parallel to the radial axis 36, and 36" is understood to be a reference axis perpendicular to the radial axis 36). In certain embodiments, the radial range $\theta_R$ is less than 15°, while the tangential range $\theta_T$ is less than 15°. In further embodiments, the radial range $\theta_R$ is less than 10°, while the tangential range $\theta_T$ is less than 10°. In still further embodiments, the radial range $\theta_R$ is less than 5°, while the tangential range $\theta_T$ is less than 5°. In optional embodiments, the radial range $\theta_R$ is less than 3°, while the tangential range $\theta_T$ is less than 3°. In the above-listed embodiments, the radial range $\theta_R$ may be equivalent to the tangential range $\theta_T$, though it need not be.

During operation of the pitch control system 38, a desired pitch angle 84A, 84B may be selected, either manually or through an automated control unit (not shown). In response to this selection, the annular actuator 44 may be translated to a new position. To this end, a linear input force translates the annular actuator 44 to an axial position corresponding to the selected pitch angle 84A, 84B. The corresponding axial position may be selected from a stored database, or calculated dynamically by the automated control unit.

As the actuator 44 is moved along the central axis 30, the mounted LTB 50 is similarly translated. The LTB inner race 52 and outer race 54, being translationally fixed to each other, move axially in unison. Although the LTB inner race 52 and outer race 54 are translated in unison, the translational motion supplied to the LTB inner race 52 is converted to a roto-translation movement at the LTB outer race 54. Specifically, the outer race 54 is forced to rotate concentrically about the inner race 52 simultaneous to the uniform axial translation. The guide shaft 64, being anchored to the non-translating rotor frame 42, directs the outer race 54 and radial pin 66 along an arcuate path 86. For embodiments including a rigid guide shaft 64, the path 86 generally corresponds to a radius defined by the fixed guide length 68.

The roto-translation movement is partially transferred to the crankshaft 76 and crank rod 72. The crank rod 72 is displaced longitudinally along the central axis 30 while its first and second ends 80, 82 are pivoted. Specifically, the second end 82 of the crank rod pivots relative to the rotation of the outer race 54, and the first end 80 pivots relative to the crankshaft journal 78. The guide shaft length 68 may be matched to the crank rod's own length to harmonize movement at both ends 80, 82 of the crank rod. In certain embodiments, the guide shaft length 68 and crank rod 72 are matched to maintain the crank rod 72 in a predetermined pivotal range θ relative to central axis 30. In such embodiments a predetermined distance is maintained between the LTB 50 and the crankshaft journal 78. In turn, longitudinal displacement of the crank rod 72 is transferred to the crankshaft 76.

Longitudinal displacement received by the crankshaft journal 78 pivots the crankshaft 76 about the radial axis 36. Since the crankshaft 76 is fixedly attached to the propeller support column 74, the blade 32 is simultaneously pivoted about the radial axis 36. Pivoting continues from the original desired pitch angle 84A until translation of the actuator 44 ceases and, therefore, until a new desired pitch angle 84B is reached.

Figure 5:
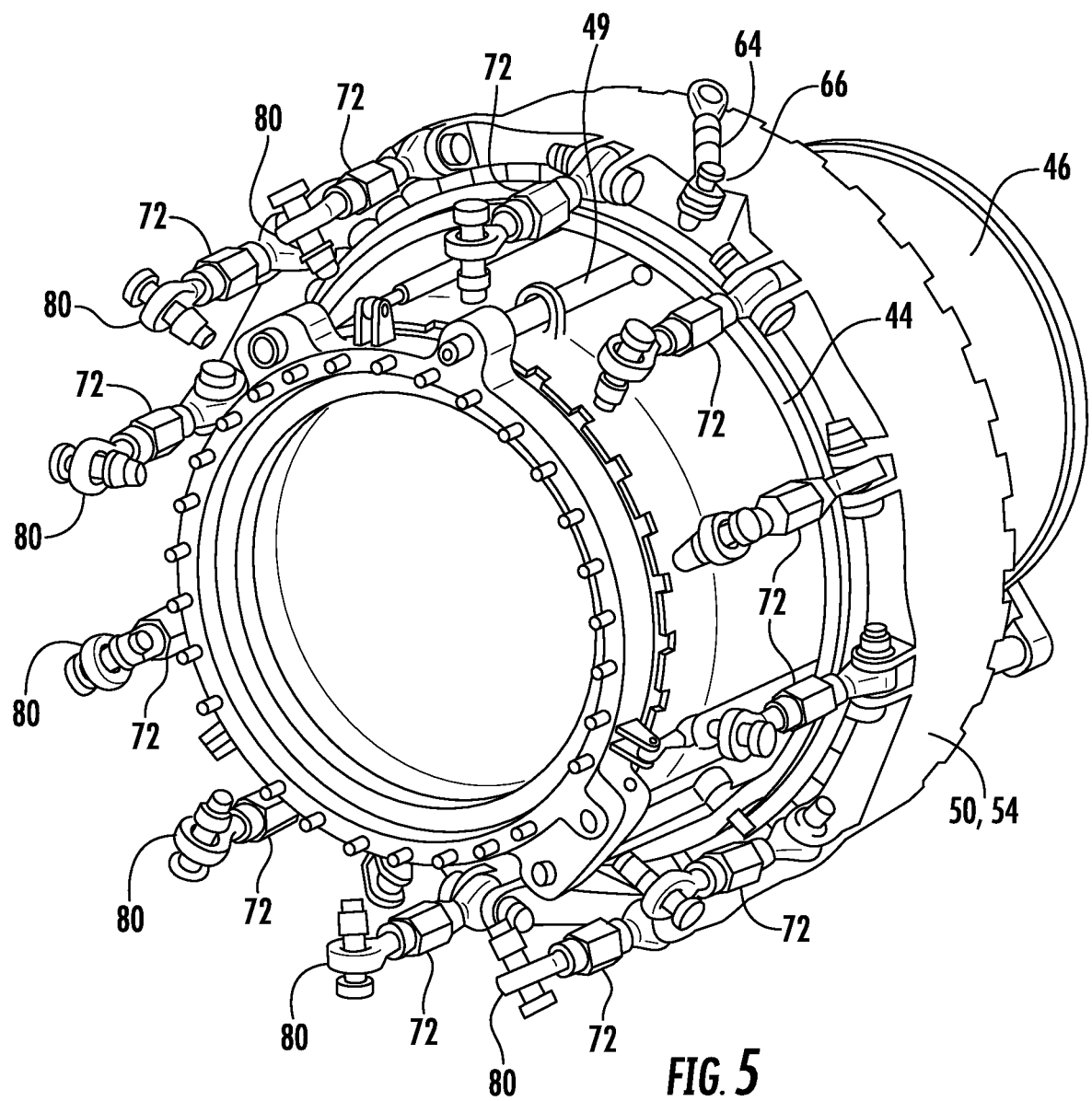
FIG. 5 is a perspective view of the embodiment of FIG. 4.

For embodiments having multiple crank rod-attached propeller blades 32, pivoting of the blades 32 may be mechanically synchronized. During such synchronization, each crank rod 72 is joined to the LTB 50 at its second end 82 and joined to a discrete crankshaft 76 at its respective first end 80, as illustrated in FIG. 5. Roto-translation at the LTB 50 translates the rods 72 uniformly and allows simultaneous axial movement between each rod 72.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch control system for a rotor assembly having a rotatable rotor frame mounted to a static engine frame about a central axis and a plurality of propeller blades circumferentially mounted to the rotor frame, the pitch control system comprising:
    an annular actuator mounted to the static frame about the central axis, the annular actuator being translatable parallel to the central axis;
    a load transfer bearing (LTB) translationally fixed to the actuator;
    a crank rod having a first end pivotally attached to the LTB, and a second end pivotally attached to a propeller blade crankshaft;
    a radial pin extending outward from the LTB; and
    a guide shaft pivotally attached to the radial pin and pivotally attached to the rotor frame to direct the radial pin along an arcuate path relative to the rotor frame upon translation of the actuator.

2. The pitch control system of claim 1, wherein the LTB comprises:
    an inner race positioned about the annular actuator, and
    an outer race rotatably and concentrically mounted on the inner race.

3. The pitch control system of claim 2, wherein the LTB further comprises:
    at least one bearing ring radially positioned between the inner race and the outer race.

4. The pitch control system of claim 3, wherein the bearing ring includes an annular row of ball bearings.

5. The pitch control system of claim 1, wherein the crank rod comprises a first end yoke assembly attached to the propeller blade crankshaft and a second end yoke assembly attached to the LTB.

6. The pitch control system of claim 1, wherein the guide shaft includes a fixed guide length, wherein the crank rod is attached to a distal journal of the crankshaft and maintains a predetermined distance between the journal and a set point of the LTB, and further wherein the guide length is harmonically matched to the predetermined distance, thereby restricting operable crank rod movement to a predetermined pivotal range.

7. The pitch control system of claim 1, wherein the annular actuator includes a variable translation length selectable according to a desired propeller pitch angle.

8. The pitch control system of claim 1, further comprising:
    a plurality of crank rods, each crank rod being pivotally attached to the LTB at the first end and discretely attached to a respective propeller blade crankshaft at the second end, wherein translation of the crank rods relative to the central axis is mechanically synchronized.

9. A gas turbine engine, comprising:
    a static frame extending along a central axis;
    a rotor frame rotatably mounted to the static frame about the central axis;
    a plurality of circumferential propeller blade assemblies attached to the rotor frame, at least one blade assembly including a variable pitch propeller blade and a crankshaft to direct pivotal movement of the blade about a discrete radial axis;
    an annular actuator mounted to the static frame, the annular actuator being translatable parallel to the central axis according a desired pitch angle of the propeller blade;
    a load transfer bearing (LTB) translationally fixed to the actuator;
    a crank rod having a first end pivotally attached to the LTB, and a second end pivotally attached the crankshaft;
    a radial pin extending outward from the LTB; and
    a guide shaft pivotally attached to the radial pin and pivotally attached to the rotor frame to direct the radial pin along an arcuate path relative to the rotor frame.

10. The gas turbine engine of claim 9, wherein the LTB comprises:
    an inner race positioned about the annular actuator; and
    an outer race rotatably and concentrically mounted on the inner race.

11. The gas turbine engine of claim 10, wherein the LTB further comprises:
    at least one bearing ring radially positioned between the inner race and the outer race.

12. The gas turbine engine of claim 11, wherein the bearing ring includes an annular row of ball bearings.

13. The gas turbine engine of claim 9, wherein the crank rod comprises a first end yoke assembly attached to the propeller blade crankshaft and a second end yoke assembly attached to the LTB.

14. The gas turbine engine of claim 9,
    wherein the guide shaft includes a fixed guide length,
    wherein the crank rod is attached to a distal journal of the crankshaft and maintains predetermined distance between the journal and a set point of the LTB, and
    further wherein the guide length is harmonically matched to the predetermined distance, thereby restricting operable crank rod movement to a predetermined pivotal range.

15. The gas turbine engine of claim 9, wherein the annular actuator includes a variable translation length selectable according to a desired propeller pitch angle.

16. The gas turbine engine of claim 9, further comprising:
    a plurality of crank rods, each crank rod being pivotally attached to the LTB at the first end and discretely attached to a respective propeller blade crankshaft at the second end, wherein the movement of the crank rods relative to the central axis is mechanically synchronized.

17. The gas turbine engine of claim 9, further comprising:
a compressor mounted about the static frame;
a combustor positioned downstream of the compressor to receive a compressed fluid therefrom; and
a turbine positioned downstream of the combustor and operably joined to the rotor frame such that a rotation of the turbine is transferred to the rotor frame.

18. A method for controlling a pitch angle of a plurality of propeller blades, the propeller blades attached to a rotor frame and extending along respective radial axes about a central axis, at least one propeller blade including a crankshaft extending from the radial axis, the method comprising the steps of:
supplying a linear input force at an annular actuator in a direction parallel to the central axis, thereby initiating a linear input movement at a load transfer bearing (LTB), wherein the LTB is included in a pitch control system that includes the annular actuator mounted to the static frame, the LTB disposed about the annular actuator, a radial pin extending from the LTB, and a guide shaft pivotally attached to the radial pin and pivotally attached to the rotor frame;
converting the linear input movement to a roto-translation movement, including directing the LTB along an arcuate path relative to the rotor frame;
transferring the roto-translation movement to the crankshaft along a crank rod positioned between the LTB and the crankshaft, including transmitting a longitudinal displacement component to the crankshaft; and
pivoting the at least one propeller blade about the radial axis according to the longitudinal displacement transmitted to the crankshaft.

19. The method of claim 18, wherein the converting step further comprises the step of rotating an outer race of the LTB about a concentric inner race of the LTB.

20. The method of claim 18, wherein the transferring step further comprises the step of translating the crank rod in a predetermined pivotal range.

\* \* \* \* \*